United States Patent [19]

Lai

[11] 4,304,712

[45] Dec. 8, 1981

[54] METHOD FOR EXTENDING THE USEFUL LIFE OF DIENIC POLYMERS WHICH ARE SENSITIVE TO OXIDATIVE DEGRADATION AND STABILIZED COMPOSITIONS RESISTANT TO OXIDATIVE DEGRADATION

[75] Inventor: John T. Lai, Broadview Heights, Ohio

[73] Assignee: The B. F. Goodrich Company, Akron, Ohio

[21] Appl. No.: 892,820

[22] Filed: Apr. 3, 1978

[51] Int. Cl.$^3$ .............................................. C08K 5/34
[52] U.S. Cl. ..................... 260/45.8 N; 260/45.8 NT; 260/45.85 B; 260/45.95 H
[58] Field of Search ....... 260/45.8 NH, 239 BD (U.S. only); 544/353

[56] References Cited

U.S. PATENT DOCUMENTS

| | | | |
|---|---|---|---|
| 2,778,825 | 1/1957 | Melamed | 106/176 |
| 2,899,359 | 8/1959 | Fancher et al. | 260/239 BD |
| 3,218,276 | 11/1965 | Ringwald et al. | 260/45.8 NH |
| 3,291,757 | 12/1966 | Sturm, Jr. et al. | 260/45.8 NH |
| 3,325,448 | 6/1967 | Tanaka et al. | 260/45.8 NH |
| 3,661,905 | 5/1972 | Ley et al. | 260/45.8 NH |
| 3,947,475 | 3/1976 | Debaun et al. | 260/239 BD |
| 4,039,508 | 8/1977 | Dhami | 260/45.8 NH |

OTHER PUBLICATIONS

Herbert et al., J. Chem. Soc., Perkin I, 1974, pp. 2657-2661.

Primary Examiner—Morton Foelak
Assistant Examiner—R. A. White
Attorney, Agent, or Firm—John H. Faro

[57] ABSTRACT

Method for extending the useful life of dienic polymers which are sensitive to oxidative degradation. According to this method such polymers are combined with a stabilizer effective amount of at least one tetrahydro-1,5-benzodiazapene compound of the formula:

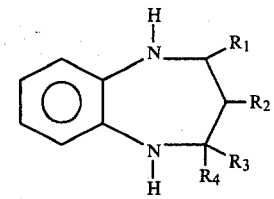

wherein $R_1$ through $R_4$ are independently selected from the group consisting of hydrogen, alkyl of 1 to 12 carbon atoms, cycloalkyl, aryl, aralkyl, provided further that $R_3$ and $R_4$ can collectively form a cyclic, alicyclic, aromatic or heterocyclic ring pendant from the two position of the above compound and $R_1$ and $R_2$ can collectively form an alicyclic ring.

The polymeric compositions formed from dienic polymers and the above stabilizer are highly suitable to use in the preparation of components for the automotive and electronics markets.

8 Claims, No Drawings

METHOD FOR EXTENDING THE USEFUL LIFE OF DIENIC POLYMERS WHICH ARE SENSITIVE TO OXIDATIVE DEGRADATION AND STABILIZED COMPOSITIONS RESISTANT TO OXIDATIVE DEGRADATION

BACKGROUND OF THE INVENTION

1. The Field of the Invention

This invention relates to a method and to composition. More specifically, this invention addresses itself to resolution of problems associated with the oxidation of dienic polymers and articles prepared from such materials. This invention also encompasses dienic polymer compositions which are resistant to oxidative degradation.

2. Description of the Prior Art

Polymers have in the past and continue to provide an attractive substitute for other more traditional types of structural materials (e.g. wood and metals) because of relatively inexpensive materials and fabrication costs. As polymers continue to find new applications in, for example, the fabrication of automotive parts and building materials, they must also become more durable and capable of withstanding prolonged exposure to a variety of degradative forces. Degradation of polymers can be caused by exposure to light, heat and/or air. Such degradation is usually manifest by either a partial or total loss of structural integrity, changes in light transmission properties, changes in color, loss or reduction in flexibility and resiliency or any combination of the above phenomena. Those attempting to avoid polymer degradation have generally selected from among three possible approaches: (a) elimination or reduction of the degradative forces; (b) isolation of the sensitive polymer material from the degradative forces; or (c) modification of the polymer composition to enhance resistance to one or more of the degradative forces. This latter approach is generally preferable since it does not require engineering or structural changes in the polymer products environment.

There are a variety of additives which have been disclosed as suitable for enhancing the resistance of polymers to one or more of the degradative forces discussed hereinabove. These additives (hereinafter referred to as "stabilizers") can be physically combined with or engrafted upon the environmentally sensitive polymer, thereby prolonging its useful life in the hostile degradative environment. Stabilizers are available which can enhance the polymers resistance to more than one of the degradative forces and, conversely, a stabilizer which is effective for prevention of, for example, oxidative degradation may have little if any effect upon the polymers resistance to other degradative agents. Thus, it is not uncommon for polymers to contain a variety of stabilizer materials, each being present for the prevention of a particular degradative reaction. One of the more difficult to control of the degradative forces is the exposure of the polymer to oxidation by the air. The impact of such exposure will, of course, vary depending upon the temperature prevailing during such exposure and the presence and/or absence of other agents either within or in contact with the polymeric material which can accelerate such degradation. Ordinarily, the effects of oxidation manifest themselves only after a prolonged and/or repeated exposure. The exposure of polymers to the degradative forces of oxidation can result in a variety of changes in such materials depending upon the degree of saturation of a polymer backbone and the various substituents pendant therefrom.

In the case of dienic polymers, the effects of oxidative degradation may be different depending upon whether or not the polymer is vulcanized. Ordinarily, unvulcanized dienic polymers will manifest oxidative degradation by becoming increasingly pliable, and in some extreme cases, tacky. By way of comparison, vulcanized dienic polymers will manifest oxidative degradation by becoming increasingly hard and brittle. As will be appreciated, such physical changes in polymer properties, and articles prepared therefrom, will adversely alter the structure of the polymeric article to the extent that failure of the article may occur.

Unfortunately the problems associated with oxidation of polymers are especially acute in dienic polymers. The reasons for such sensitivity is the presence of unsaturated linkages in the polymer backbone or in sidechains. Such unsaturation is particularly vulnerable to oxidation and such oxidation can be accelerated by various forms of radiant energy (e.g. heat and/or ultraviolet lights). Many different classes of materials have been previously disclosed as suitable for use in the stabilization of polymeric materials against the degradation from the forces discussed herein. Such stabilizers are, however, only generally effective for the prevention of one form of degradative reaction and thus, it is necessary to use combinations of stabilizers to impart the desired protection to polymeric materials where exposure to several degradative forces and/or agents is contemplated.

The stabilization of dienic polymers against oxidation can be achieved by the incorporation within such polymers of naphthofuranyl naphthyl compounds (U.S. Pat. No. 3,940,364); aliphatic esters of carboxymethene and carboxyethenethio succinic acid (U.S. Pat. No. 3,909,493); hydroxyphenyl alkyleneyl isocyanurate/thiophosphite mixtures (U.S. Pat. No. 3,909,491); and benzofuranylphenols (U.S. Pat. No. 4,054,551). The above listing is by no means exhaustive of the various types of compounds and mixtures of compounds which have been previously used in the stabilization of dienic polymers against the forces of oxidative degradation. In a number of instances, the materials useful in the stabilization of dienic polymers against oxidative degradation are also effective in the stabilization of other polyolefins (e.g. see for example previously referenced Patents '493 and '491).

As noted above, such oxidation can be accelerated where the polymer is exposed to radiant energy. Thus, it may be desirable to use combinations of stabilizers in order to eliminate or reduce the contributing causes to such degradation. Some stabilizers, such as Goodrite 3114, [1,3,5-tris(3'5'-di-t-butyl-4'-hydroxy-benzyl)-s-triazine-2,4,6(1H,3H,5H)-trione]—available from The B. F. Goodrich Chemical Company, are highly effective for the stabilization of polyolefins against the degradative forces of oxidation and ultraviolet light. Other commercially available stabilizer materials, such as Tinuvin 770 [bis(2,2,6,6-tetramethyl-4-piperidinyl) sebacate]-available from Ciba-Geigy, are of limited effectiveness in preventing oxidation of polymers, although being highly effective in prevention of UV degradation. This has also been generally true of other hindred amines.

The effectiveness of a stabilizer material is measured not only in absolute terms, but also requires evaluation of its compatibility with the stabilized host polymer and its effectiveness at low concentrations. As will be appreciated, the addition of high concentrations of stabilizer compounds to polymeric materials can adversely impact the processing of such materials and the physical properties of the articles prepared therefrom. Thus, stabilizer effectiveness, and its commercial acceptance, is based not solely upon its capabilities regarding the prevention of certain degradative reactions but also its ability to do so at low concentrations without adversely altering the polymers physical properties and its ability to achieve such beneficial results in the presence of other stabilizer materials. All of the above factors must be taken into consideration in evaluating the efficiency of a stabilizer, and as might be expected, the larger the number of factors to be considered in such evaluation, the more difficult for a stabilizer to achieve commercial acceptance. Because of such changing and ever demanding requirements, there is a continuing need for development of new stabilizer systems which can satisfy the technical specifications of the compounder, are cheap to synthesize and are highly compatible with the host polymer and other additives used in conjunction therewith.

SUMMARY OF THE INVENTION

Accordingly, it is the object of this invention to remedy the above as well as related deficiencies in the prior art.

More specifically, it is the principal object of this invention to provide a stabilized dienic polymer composition wherein the stabilizer is effective for enhancement of the polymers resistance to oxidative degradation.

Another object of this invention is to provide a stabilized polymer composition wherein the stabilizer is not only effective for enhancement of the compositions resistance to oxidative degradation, but is also highly compatible with other stabilizer compounds traditionally used in conjunction therewith.

Additional objects of this invention include a method for enhancement of the resistance of dienic polymers to oxidative degradation, thereby prolonging their useful life in an environment where such degradative forces are present.

The above and related objects are achieved by providing a method for enhancement in the useful life of dienic polymers by increasing their resistance to oxidative degradation. This is achieved by combining dienic polymers with a stabilizer effective amount of at least one substituted tetrahydro-1,5-benzodiazapine compound formula:

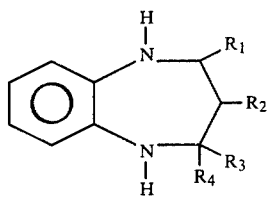

wherein $R_1$ through $R_4$ are independently selected from the group consisting of hydrogen, alkyl of 1 to 12 carbon atoms, cycloalkyl, aryl, aralkyl, provided further that $R_3$ and $R_4$ can collectively form a cyclic, alicyclic, aromatic or heterocyclic ring pendant from the two position of the above compound and $R_1$ and $R_2$ can collectively form an alicyclic ring. In the preferred embodiments of the invention one or more of $R_1$, $R_3$ and $R_4$ are other than hydrogen, and most preferably methyl or polymethylene, such as in the compounds 2,2,4-trimethyl-2,3,4,5-tetrahydro-1H-1,5-benzodiazapine, 2-pentamethylene-3,4-tetramethylene-2,3,4,5-tetrahydro-1H-1,5-benzodiazapine and 2-methyl-2-hexyl-3-pentyl-4-methyl-2,3,4,5-tetrahydro-1H-1,5-benzodiazapine.

The above stabilizers are highly effective for retarding the oxidative degradation of dienic polymers and can be used in such polymers along with other stabilizing agents.

DESCRIPTION OF THE INVENTION INCLUDING PREFERRED EMBODIMENTS

The compositions of this invention can be readily prepared by simply combining the dienic polymer and the stabilizer compound or compounds under conditions designed for the uniform distribution of such stabilizers throughout the polymer. Ordinarily, the concentration of the stabilizer in the polymer will range from about 0.05 parts by weight stabilizer per 100 parts dienic polymer to about 5 parts by weight stabilizer per 100 parts dienic polymer. The preferred content of stabilizer in the polymer composition of this invention is typically in the range of from about 0.1 parts by weight stabilizer per 100 parts dienic polymer to 1 part by weight stabilizer per 100 parts dienic polymer.

Virtually all dienic polymers are sensitive, at least to some degree, to oxidative degradation. The term "oxidative degradation" is used throughout this disclosure in reference to the dienic polymers to describe any oxidative changes in the physical, chemical and/or electrical properties of the polymer. Such degradative changes can include cross-linking of the polymer, depolymerization, and other related phenomena.

The dienic polymers suitable for use in the compositions of this invention are sulphur vulcanizable and may contain from about 0.5% to about 50% by weight of olefinic ($>C=C<$) unsaturation based upon total polymer weight. The olefinic moiety may be present in the polymeric main chain (backbone) or in pendant (side-chain) groups, or both. Examples of suitable dienic polymers include polymers such as natural rubber, cis-polyisoprene, cis-polybutadiene (CB), acrylonitrile-butadiene-styrene copolymers (ABS), butadiene-acrylonitrile rubbers (NBR), isoprene-acrylonitrile rubbers, polyisobutylene, polychloroprene, butadiene-styrene rubbers (SBR), isoprene-styrene rubbers and the like. Also suitable are polymers such as isoprene-isobutylene (butyl) rubbers, copolymers of conjugated dienes with lower alkyl and alkoxy acrylates such as ethyl acrylate, butyl acrylate, methoxyethyl acrylate and the like, and ethylene-propylene-diene polymers (EPDM) containing from about 0.5 percent to about 20 percent by weight of at least one dienic termonomer. Suitable EPDM dienic termonomers include conjugated dienes such at butadiene, 1,3-pentadiene, and the like; nonconjugated dienes such as 1,4-pentadiene, 1,4-hexadiene, and the like; cyclic dienes such as cyclopentadiene, dicyclopentadiene, and the like; and alkenyl norbornenes such as 5-ethylidene-2-norbornene and the like.

The dienic polymers may be vulcanized by methods known to the art. Suitable vulcanizing agents include elemental sulfur and compounds capable of yielding elemental sulfur such as tetramethylthiuram disulfide, tetraethylthiuram disulfide, dipentamethylenethiuram hexasulfide, and the like.

The stabilizer compounds, namely, the substituted 1,2,3,4-tetrahydro-1H-1,5-benzodiazepines, suitable for use in the compositions and methods of this invention can be readily prepared by techniques disclosed in the open literature, see for example J.Chem.Soc. Perkin I, page 2657 (1974). Such synthesis briefly stated, generally involves the one step condensation of an ortho-phenylenediamine and a cyclic ketone in cold ethanol in the presence of borontrifluoride/ether complex.

In addition to the stabilizer compound(s), a broad range of compounding ingredients can be used in the above dienic polymer vulcanizates, including sulfur-containing and nitrogen-containing accelerators. Examples of suitable accelerators include metal salts of dialkyl, diaryl and alkaryl dithiocarbamates, such as bismuth, copper, lead and zinc dimethyl dithiocarbamates, cadmium, selenium, tellurium and zinc diethyl dithiocarbamates, sodium and zinc dibutyl dithiocarbamates, zinc ethyl phenyl dithiocarbamate, zinc dibenzyl dithiocarbamate, and the like; other dithiocarbamates such as piperidinium pentamethylene dithiocarbamate, N-cyclohexylethyl ammonium cyclohexylethyl dithiocarbamate, N-pentamethylene-ammonium-N-pentamethylene dithiocarbamate, and the like; benzothiazoles such as 2-mercaptobenzothiazole and the zinc salt thereof, 2,2'-benzothiazyl disulfide, 2-morpholinothiobenzothiazole, 2-(2,6 dimethyl-4-morpholinothio)-benzothiazole and the like; benzothiazole-sulfenamides such as N-diethyl-2-benzothiazyl sulfenamide, N-t-butyl-2-benzothiazole sulfenamide, N-cyclohexyl-2benzothiazole sulfenamide, N-oxydiethylene-2-benzothiazole sulfenamide and the like; thiuram sulfides such as tetramethyl thiuram disulfide, tetraethyl thiuram disulfide, dimethyl diphenyl thiuram disulfide, dipentamethylene thiuram hexasulfide and the like; thioureas such as ethylene thiourea, trimethyl thiourea, N,N'-diethyl thiourea, N,N'-dibutyl thiourea, N,N'diphenyl thiourea, and the like; morpholines such as 4,4'-dithiomorpholine and the like; polyamines such as triethylene diamine, hexamethylene tetraamine, tricretonylidene tetraamine, and the like; aldehyde-amine condensation products such as acetaldehyde-ammonia, heptaldehyde-ammonia, butyraldehyde-aniline, and the like, imidazolines such as 2-mercaptoimidazoline, and the like; and guanidines such as diphenyl guanidine, di-o-tolyl guanidine, and the like. Excellent results were obtained using 2-morpholinothiobenzothiazole.

Other compounding ingredients suitable for use in the dienic polymer compositions, and their corresponding styrene and acrylonitrile copolymers, include fillers such as carbon blacks, calcium and magnesium carbonates, calcium and barium sulfates, aluminum silicates, silicon dioxide, phenolformaldehyde and polystyrene resins, asbestos, and the like; plasticizers and extenders including dialkyl and diaryl acid esters such as diisobutyl, diisooctyl, diisodecyl and dibenzyl oleates, stearates, sebacates azelates, phthalates, and the like, and naphthenic and paraffinic oils, castor oil, tall oil and the like; and antioxidants, antiozonants and stabilizers such as di-$\beta$-naphthyl-p-phenylenediamine, phenyl-$\beta$-naphthylamine, N,N'-di-(2-octyl)-p-phenylenediamine, 2,2'-methylene-bis(4-methyl-6-t-butylphenol), 2,6-di-t-butyl-p-cresol, 2,2'-thiobis(4-methyl-6-t-butylphenol), distearyl thiodipropionate,dilauryl thiodipropionate, 2,4-bis(4-hydroxy-3,5-t-butylphenoxy)-6-(n-octylthio)-1,3,5-triazine, tetrakis methylene 3-(3',5'-di-t-butyl-4'-hydroxyphenyl)propionate methane, 4-isopropylamine diphenylamine, tri(-nonylated phenyl) phosphite, and the like. Other compounding ingredients may also be used, such as pigments, tackifiers, flame retardants, fungicides, and the like.

The efficacy of the substituted tetrahydro-1,5-benzodiazapines to retard oxidative degradation of dienic polymers is determined by initially preparing a dienic polymer composition containing such stabilizer and then measuring its Mooney viscosity before and after aging according to procedure ASTM D-1646-72 using a large rotor and one-minute warm-up time. Mooney buttons were aged at 70° C. for ten days in an oven according to procedure ASTM D-573-67. The effectiveness of a stabilizer against oxidation can be directly correlated with the percent loss in Mooney viscosity; that is the smaller percent loss in Mooney viscosity of the stabilized polymer composition, the more effective the stabilizer in preventing oxidation.

EXAMPLES

The Examples which follow further define, describe and illustrate the preparation and evaluation of the compositions of this invention. Apparatus and techniques used in both the compounding of such compositions and in their evaluation are standard or, as hereinbefore described. Parts and percentages appearing in such Examples are by weight unless otherwise indicated.

EXAMPLES I–IV

A synthetic natural rubber (obtained by solution polymerization of isoprene and containing 99% cis-1,4-addition product and 0.8% trans-1,4-addition product) was stabilized with 1 part by weight (phr) of different stabilizer materials in the conventional manner. The resultant composition was thereafter aged for 10 days at 70° C. The table which follows provides the results of such stabilization, as reported in terms of percent loss in Mooney viscosity and color retention.

TABLE I

| Example | Stabilizer | % Loss In Mooney Viscosity | Color |
|---|---|---|---|
| I | CAO-1(2,6-di-t-butyl p-cresol-available from Ashland Chemical Co.) | 15 | Clear |
| II | 2,2,4-trimethyl-2,3,4,5-tetrahydro-1H-1,5-benzodiazepine | 1 | Clear |
| III | 2-pentamethylene-3,4-tetramethylene-2,3,4,5-tetrahydro-1H-1,5-benzodiazepine | 6 | Clear |
| IV | 2-methyl-2-hexyl-3-pentyl-4-methyl-2,3,4,5-tetrahydro-1H-1,5-benzodiazepine | 10 | Clear |

As is evident from the above comparative data, the stabilizers of the methods and compositions of this invention are significantly more effective than one of the popular commercial anti-oxidants. Moreover, these materials achieve such enhancement in polymer stability without staining or discoloration of the host material.

The foregoing description and Examples have been provided for the purposes of illustration of representative embodiments of this invention and not intended to delineate its scope which is set forth in the following claims.

What is claimed is:

1. A composition comprising a polymer having unsaturation along its backbone, and/or unsaturated pendant groups, and at least one stabilizer compound of the formula:

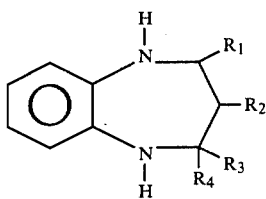

wherein $R_1$ through $R_4$ are independently selected from the group consisting of hydrogen, alkyl of 1 to 12 carbon atoms, cycloalkyl, aryl, aralkyl, provided further that $R_3$ and $R_4$ can collectively form a cyclic, alicyclic, aromatic or heterocyclic ring pendant from the four position of the above compound and $R_1$ and $R_2$ can collectively form an alicyclic ring said stabilizer being present in the polymer composition in an amount sufficient to extend the useful life of said polymer by enhancement in the polymers resistance to oxidative degradation.

2. The composition of claim 1, wherein the stabilizer is 2,2,4-trimethyl-2,3,4,5-tetrahydro-1H-1,5-benzodiazepine.

3. The composition of claim 1, wherein the stabilizer is 2-pentamethylene-3,4-tetramethylene-2,3,4,5-tetrahydro-1H-1,5-benzodiazepine.

4. The composition of claim 1, wherein the stabilizer is 2-methyl-2-hexyl 3-pentyl-4-methyl-2,3,4,5-tetrahydro-1H-1,5 benzodiazepine.

5. A method for extending the useful life of unsaturated polymers against oxidative degradation, said method comprising:

incorporating within said unsaturated polymer a stabilizer effective amount of a compound of at least one compound of the formula:

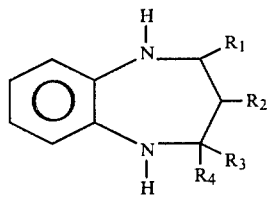

wherein $R_1$ through $R_4$ are independently selected from the group consisting of hydrogen, alkyl of 1 to 12 carbon atoms, cycloalkyl, aryl, aralkyl, provided further that $R_3$ and $R_4$ and collectively form a cyclic, alicyclic, aromatic or heterocyclic ring pendant from the four position of the above compound and $R_1$ and $R_2$ can collectively form an alicyclic ring said compound being introduced into the polymer in an amount sufficient to retard oxidation thereof.

6. The method of claim 5, wherein the compound is 2,2,4-trimethyl-2,3,4,5-tetrahydro-1H-1,5-benzodiazepine.

7. The method of calim 5, wherein the compound is 2,-pentamethylene-3,4-tetramethylene-2,3,4,5-tetrahydro-1H-1,5-benzodiazepine.

8. The method of claim 5, wherein the compound is 2-methyl-2-hexyl-3-pentyl-4-methyl-2,3,4,5-tetrahydro-1H-1,5-benzodiazepine.

* * * * *